United States Patent [19]
Allan et al.

[11] Patent Number: 5,851,474
[45] Date of Patent: Dec. 22, 1998

[54] INJECTION MOLDING WITH PERIODIC FORCES TO THE MATERIAL IN THE MOLD

[75] Inventors: Peter Stewart Allan, Bucks; Michael John Bevis, Uxbridge, both of United Kingdom; Kazuharu Yasuda, Yokohama, Japan

[73] Assignees: Brunel University of Uxbridge, United Kingdom; Asahi Kasei Kogyo Kabushiki Kaisha, Japan

[21] Appl. No.: 630,525

[22] Filed: Apr. 10, 1996

[30] Foreign Application Priority Data

Apr. 11, 1995 [GB] United Kingdom ............... 9507533
May 24, 1995 [GB] United Kingdom ............... 9510532

[51] Int. Cl.$^6$ ........................... B29C 45/00; B29C 45/73
[52] U.S. Cl. ................ 264/403; 264/69; 264/328.8; 264/328.12; 264/328.16
[58] Field of Search .................. 264/69–71, 108, 264/403, 328.7, 328.8, 328.12, 328.14, 328.16; 425/562, 547, 563, 573, 557, 567

[56] References Cited

U.S. PATENT DOCUMENTS

| | | | |
|---|---|---|---|
| 4,340,551 | 7/1982 | Wada et al. | 264/328.16 |
| 4,469,649 | 9/1984 | Ibar | 264/70 |
| 4,925,161 | 5/1990 | Allan et al. | 264/69 |
| 5,254,298 | 10/1993 | Ibar | 264/69 |
| 5,472,335 | 12/1995 | Morikita | 264/71 |
| 5,494,426 | 2/1996 | Ibar | 264/71 |
| 5,538,413 | 7/1996 | Gardner et al. | 264/71 |
| 5,543,092 | 8/1996 | Ibar | 264/40.6 |

FOREIGN PATENT DOCUMENTS

| | | |
|---|---|---|
| 2081171 | 2/1982 | United Kingdom . |
| 2170142 | 7/1986 | United Kingdom . |

*Primary Examiner*—Jill L. Heitbrink
*Attorney, Agent, or Firm*—Mary R. Bonzagni, Esq.; Holland & Bonzagni, P.C.

[57] ABSTRACT

An injection moulding process for moulding a material in a mould having a mould cavity and at least one channel communicating with the mould cavity, each channel entering the mould at a respective mould inlet includes the steps of heating inner surface areas of the mould to a temperature above the heat distortion temperature of the material; supplying the molten material into the mould by way of at least one channel and subjecting the molten material to a propelling force, sufficient to propel it through the channel into the mould; causing the molten material in the mould to solidify; applying periodic forces to the material in the mould at a plurality of spaced-apart regions, first and second of the regions being located either side of molten material in the mould cavity, the periodic force being applied with a difference in phase so as to cause shear of molten material within the mould cavity between the first and second regions; cooling the mould below the heat distortion temperature of the resin while or after applying the periodic force; and then opening the mould, and removing the moulded article.

8 Claims, 13 Drawing Sheets

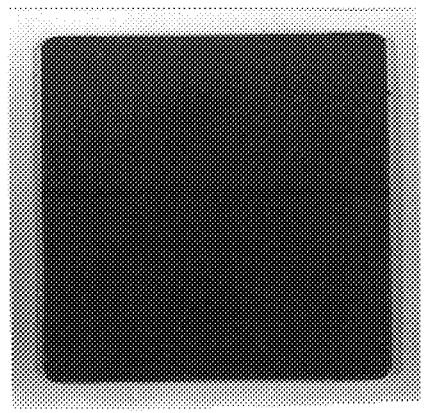
FIGURE 17-(a)
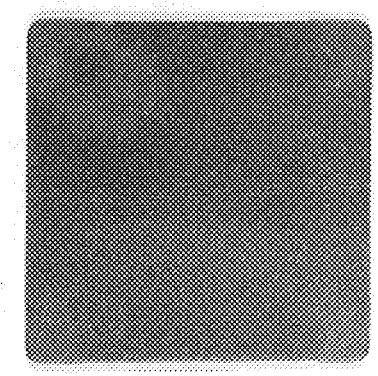
FIGURE 17-(b)
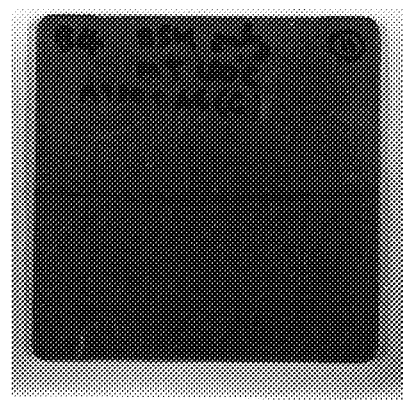
FIGURE 17-(c)

INJECTION MOLDING WITH PERIODIC FORCES TO THE MATERIAL IN THE MOLD

BACKGROUND OF THE INVENTION

The present invention relates to an injection moulding process which provides for a moulded article whose microstructure is controlled. The invention also relates to injection moulded articles produced from molten material containing at least one kind of thermoplastic resin, and which exhibit improved appearance and mechanical properties.

Heretofore, conventional injection moulding of thermoplastic resins has, in general, been based on a technique, in which a resin mixture is moulded in a metal mould by utilizing the plasticity of the thermoplastic resin. The thermoplastic resin is caused to melt and is injected in to the mould, under a static holding pressure, and is then solidified in the mould by cooling it to obtain the moulded article. Thus, it is necessary to cool the moulded resin mixture to a temperature below the heat distortion temperature of the resin employed, in order to attain solidification of the resin mixture, so as to release and remove the moulded article from the mould in a satisfactory manner. When the moulded article is produced by the above-mentioned conventional moulding, there may sometimes be problems which relate to appearance and mechanical properties.

The first problem relative to appearance may occur with thermoplastic resins which contain reinforcing materials and/or fillers such as glass fiber, mica and metals. The reason is that the temperature of the metal mould is held usually below the heat distortion temperature of the resin employed. Also it is current practice to cool the metal mould to a temperature above the dew point by using a refrigerant, in order to increase productivity. The molten thermoplastic resin mixture, upon contact with the cold surface of the metal mould, is cooled abruptly and rapidly loses its ability to flow near the surface of the mould, whereby the impression of the mould surface is greatly impaired, and results in a considerable irregularity on the surface of the moulded article.

The elevation of the temperature of the metal mould has been proposed as a measure for preventing premature solidification of the resin mixture. However, an increase in the temperature of a metal mould will naturally require a longer cooling time, and this may result in the moulded article being taken out of the mould, while still incompletely solid and thus exhibiting poor dimensional stability. Therefore, in actual practice, the temperature of the metal mould is adjusted to a temperature that is a compromise for the adverse effects of these contradictory conditions.

An effective method for improving the injection moulding art, is proposed in GB-B-2,081,171, in which the inner surfaces of the metal mould are preheated by high-frequency induction heating. With this art, the mould temperature in injection moulding can be controlled. However, though the skin layer of the moulded article is improved using this technology, it is difficult to control the micromorphology of the core layer of the moulded article. Moreover it is difficult to improve the appearance of weld line marks in moulded articles containing metal flake, such as moulded articles of transparent ABS resin with aluminum flake as filler.

The presence of internal weld lines in articles moulded from thermoplastic resin may also result in a substantial reduction in mechanical properties. It is well known that the properties, notably mechanical properties such as tensile modulus and strength, of a thermoplastic material, may be enhanced in a given direction by causing the material to be oriented in that direction. Many processes have now been devised for accomplishing this enhancement of mechanical properties, and include imparting plastic strain to the solid material. All such processes provide, oriented products of comparatively simple, and constant, cross-section: examples are fiber and film, including biaxially oriented film; and rod, tube and sheet stock. No comparable benefit has hitherto been available for thermoplastic materials moulded from the melt into articles of complex geometry.

In relation to the conventional injection moulding process, the molten mass of mouldable material is injected into the mould cavity from one feeding point and the subsequent packing force is also applied at this single point. For certain requirements of mould design, in particular moulds with long flow paths and moulds with variations in cavity wall thickness, the single feed may be split so that the cavity can be filled satisfactorily from a number of feeds, or gating points. This practice results in the formation of internal weld lines within the moulded part, at the positions where the various melt flow fronts from the multiple gate points meet. It has been shown that the presence of weld lines can cause undesirable reductions in the mechanical properties of the moulded article.

The GB-B-2,170,142 describes a process in which a filled molten material in the mould cavity can be sheared during solidification. With this art, the level of control over the microstructure throughout the bulk material is extremely high, resulting in enhancement of the article's physical properties. However, though the bulk material can be controlled by this technology, it is difficult to control the micromorphology of the skin layer of the moulded article, because the skin layer solidifies as soon as the molten material contacts the cold surface of the mould. As a result, the impression of the mould surface is greatly impaired and results in a considerable irregularity on the surface of the moulded article.

The present invention seeks to provide improved injection moulding which can permit the manufacture of injection moulded articles exhibiting superior surface characteristics.

The present invention also seeks to provide injection moulded articles with improved mechanical properties, for example thermoplastic resin compositions containing reinforcing materials and/or fillers.

SUMMARY OF THE INVENTION

According to the present invention, there is provided an injection moulding process for moulding a material in a mould having a mould cavity and at least one channel communicating with the mould cavity, each channel entering the mould at a respective mould inlet, the process including the steps of: heating inner surface areas of the mould to a temperature above the heat distortion temperature of the material; supplying the molten material into the mould by way of at least one channel and subjecting the molten material to a propelling force, sufficient to propel it through the channel into the mould; applying periodic forces to the material in the mould at a plurality of spaced-apart regions, a first and a second of the regions being located on either side of the molten material in the mould cavity, the periodic force being applied with a difference in phase so as to cause shear of the molten material within the mould cavity between the first and second regions; allowing the molten material in the mould to solidify by cooling the mould below the heat distortion temperature of the resin while or after applying the periodic force; and then opening the mould, and removing the moulded article. The heat distortion temperature herein used corresponds to that prescribed by ASTM D648 (18.6 kg/cm² Fiber Stress.

The inner surface of the metal mould is preferably selectively heated only superficially to a temperature above the heat distortion temperature of the material using high frequency induction heating. In some embodiments, the whole molten material, both the skin and the core layer can be caused to flow after the initial mould filling. And then the molten material is caused to solidify while maintaining a shear force and/or a packing force, and is then demoulded.

Such instantaneous heating may be achieved by heating methods such as infrared heating, introducing a high temperature fluid in the mould, laser beam, and so on. However the most suitable instantaneous heating can be effected by use of a special heating method of high-frequency induction heating. In the preferred embodiment, the temperature in the skin layer of the mould inner surface is elevated at a fast rate. The actual rate of heat elevation is determined by taking into account the actual heat processing temperature of the resin employed, the dimensions of the moulded product, and the mould release temperature. It is recommended, however, to heat to a predetermined temperature at a heat elevation rate of 80° C. per minute or more, preferably 480° C./min. or higher and most preferably at 1200° C./min. By employing such instantaneous heating, only a thin layer over the inner surface of the metal mould can be heated to the processing temperature of the resin, above its heat distortion temperature, without the heat being conducted into the interior of the metal mould and without causing the whole metal mould to be heated, so as to accommodate the prompt heat removal at time of cooling. Thus, it is possible to shorten the moulding cycle with simultaneous attainment of higher surface quality of the moulded articles. Furthermore, by employing the high-frequency induction heating, it is possible to eliminate possible contamination of the metal mould by the heating fluid mentioned. Other advantages of the use of high-frequency induction heating, may be recited as follows:

(a) facilitate temperature control,
(b) enabling either homogeneous heating over the whole surface of the mould or selective heating, including local heating of specific areas additional to the above mentioned superficial heating, thus enabling by design the selective heating of either the whole mould or a local part of the mould,
(c) eliminating adverse effects of heat on the operators,
(d) offers a push-button automatic operation. Additional benefit is seen in subjecting the supplied molten material to a shear force by applying a periodic force to each of a plurality of regions of the molten material, there being a difference in the periodic force applied to at least two different such regions effective to cause shear of the molten material at least between the two such regions.

While such a process may be effected with the periodic forces being in phase, provided that the frequency of one such force is an integral multiple of the other(s), it may be particularly desirable that the periodic force applied to at least two different regions of the molten material are of the same frequency, especially where the periodic force applied to at least two different regions of the molten material are out of phase, for example 180° out of phase, with each other.

The periodic force may be applied to a plurality of regions of the molten, mouldable material by dividing the supply of the material into a plurality of channels, for example two channels, and applying, by means of a piston variably reciprocable in a cylinder communicating with the channel, a periodic force thereto. The force will be positive when the piston tends to compress the molten, mouldable material and negative when it tends to permit expansion of the molten, mouldable material.

Forces substantially higher than those generally used in moulding processes may be employed to enhance the force to about 4820 bar (70,000 p.s.i.), typically from 2750 bar to 5520 bar (40,000 to 80,000 p.s.i.).

The periodic force would be applied for at least the minimum time consistent with obtaining the controlled cooling and degree of orientation required. This depends principally on the mould cavity dimensions and the nature of the mouldable composition.

Immediately prior to solidification of the molten, mouldable materials, the periodic forces may be applied in phase to provide auxiliary packing pressure to the mould cavity. Furthermore, sequences wherein the periodic forces are effective to cause shear may be interposed with sequences wherein the forces provide auxiliary packing pressure.

The process disclosed herein can be used for all kinds of thermoplastic resins, such as styrene resin such as polystyrene (PS), rubber reinforced styrene base resin such as high impact polystyrene (HIPS) and medium impact polystyrene (MIPS), styrene/acrylonitrile resin (SAN resin), butyl acrylate rubber/acrylonitrile/styrene copolymer (AAS), ethylene-propylene rubber/acrylonitrile/styrene copolymer (AES), chlorinated polyethylene/acrylonitrile/styrene copolymer (ACS), ABS resins including acrylonitrile/butadiene/styrene copolymer, acrylonitrile/butadiene/styrene/$\alpha$-methyl styrene copolymer and acrylonitrile/methyl methacrylate/butadiene/styrene copolymer, and so on. These may be acrylic resins such as polymethyl methacrylate (PA), and so on. These may be polyolefin resins such as low density polyethylene (LDPE), high density polyethylene(HDPE), polypropylene (PP), and so on. These may be vinyl chloride resin such as polyvinyl chloride (PVC), polyvinylidene chloride (PVDC), ethylene vinylacetate vinylchloride copolymer, ethylene vinylchloride copolymer, and so on. These may be polyester resins such as polyethylene terephthalate (PETP or PET), polybutylene terephthalate (PBTP or PBT), and so on. These may be polycarbonate resin such as polycarbonate (PC), modified polycarbonate, and so on. These may be polyamide resins such as polyamide 66, polyamide 6, polyamide 46, and so on. These may be polyacetal resins (POM) such as polyoxymethylene copolymer, polyoxymethylene homopolymer. These may be other engineering plastics and super engineering plastics such as polyether sulphone (PES), polyether imide (PEI), thermoplastic polyimide (TPI), polyetherketone (PEK),polyetheretherketone (PEEK), polyphenylene sulphide (PPS), polyphenylene ether (PPE), polysulphone (PSU), and so on. These may be cellulosics such as cellulose acetate (CA), cellulose acetate butyrate (CAB), ethyl cellulose (EC), and so on. These may be liquid crystals polymers (LCP) resin such as liquid crystalline polyester, liquid crystalline aromatic polyester, and so on. These may be thermoplastic elastomers such as thermoplastic elastomeric polyurethanes (TPU), thermoplastic-elastomeric styrene-butadienes (SBC), thermoplastic-elastomeric polyolefins (TPO), thermoplastic-elastomeric polyesters (TPEE), thermoplastic-elastomeric polyvinyl chlorides (TPVC), thermoplastic-elastomeric polyamides (TPAE), and so on. These may be materials which synthesize the above mentioned thermoplastic resins in process of moulding in the present invention. Blends of one or more of thermoplastic resins may be moulded by the process. The thermoplastics may contain fillers and/or additives.

The process can also be used for all kinds of thermosetting resins which are cured under sufficient heat, such as phenol formaldehyde resin (P), urea formaldehyde resin (UF), melamine-formaldehyde resin (MF), unsaturated polyester (UP), epoxide resin (EP), diallyl phthalate resin (DAP), silicone (SI), polyurethane (PUR), polyimide (PI), and so on. The thermosetting resin may contain fillers and/or additives. The thermosetting resin may contain catalyst and/or curing agent.

The filler to be incorporated in the thermoplastic resin composition and/or mouldable materials can include those of inorganic nature, for example glass fiber, glass beads, calcium carbonate, mica, asbestos, and so on and powder, hollow and flake material of metals such as iron, copper, zinc and aluminum, as well as oxides and hydroxides of these metals.

The process can also be used for sandwich moulding, in which the injection of core material causes a skin material (such as paint or other surface finish) to be spread evenly over the surface. The modification of the moulded part will be caused by the action of the shearing means on both the skin layer material and core material.

An embodiment of the present invention is described below, by way of example only, with reference to the accompanying drawings, in which:

BRIEF DESCRIPTION OF THE DRAWINGS

FIG. 17 show photographs of the surface appearances in accordance with Reference 3;

DETAILED DESCRIPTION OF THE INVENTION

Figure 1:
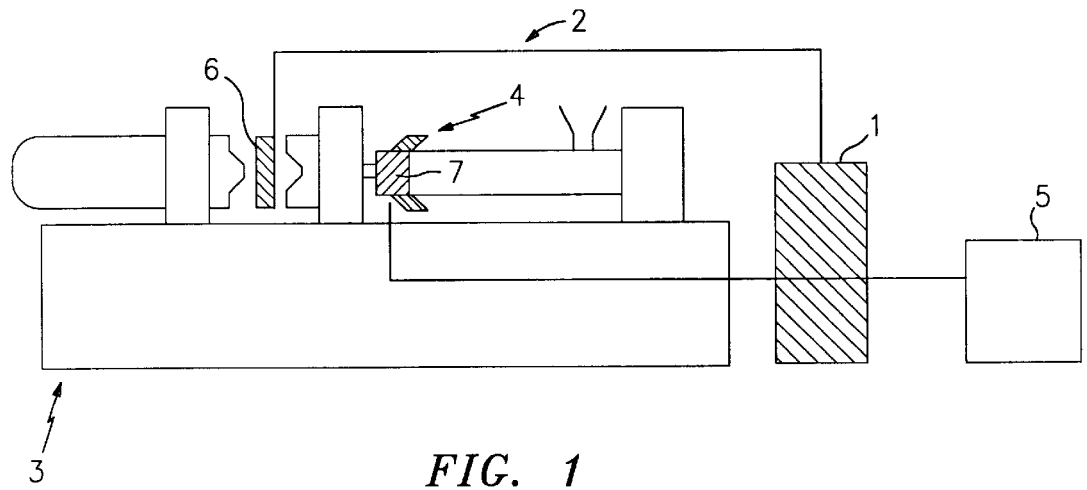
FIG. 1 shows in schematic illustration an embodiment of injecting moulding apparatus.
Figure 2:
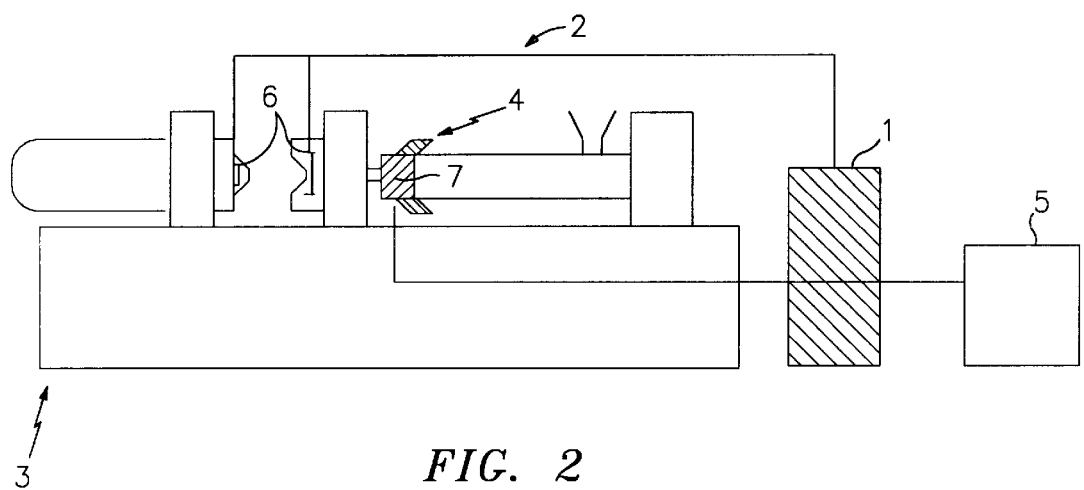
FIG. 2 is another embodiment comparable to FIG. 1.

As shown in FIG. 1 and FIG. 2, the embodiment of apparatus shown consists of an injection moulding machine 3, a high-frequency induction heating device 2, and a shear control device 4.

The high frequency induction heating device is composed of a high-frequency oscillator and controller 1 and an inductance coil (inductor) 6 installed near the inner surface of the metal mould and connected to the oscillator 1 and controller 1. The oscillator may be separated from the controller. The shear control device is composed of a manifold 7, a hydraulic pump 5 and controller (not shown). In the embodiment shown in FIGS. 1 and 3, the inductor is inserted in the mould cavity by being placed between the two mould halves of the split metal mould by robot operation. In the embodiment shown in FIG. 2, the inductor 6 is built into the mould.

Figure 3:
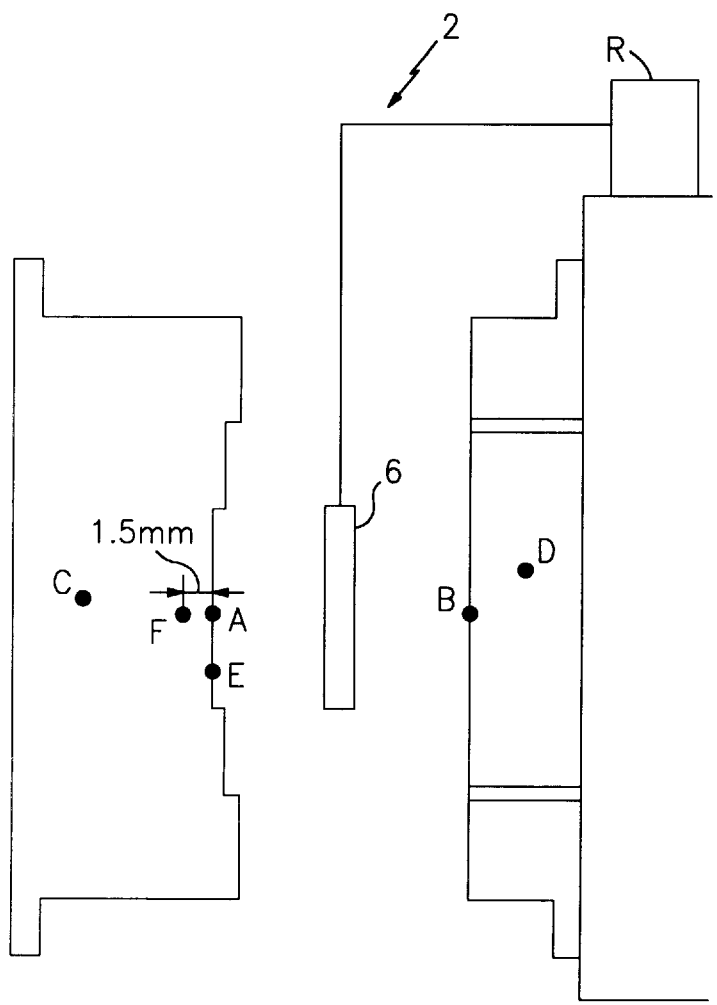
FIG. 3 shows the portion of a metal mould employing a high frequency inductor inserted within the mould cavity, in vertical section.
Figure 13:
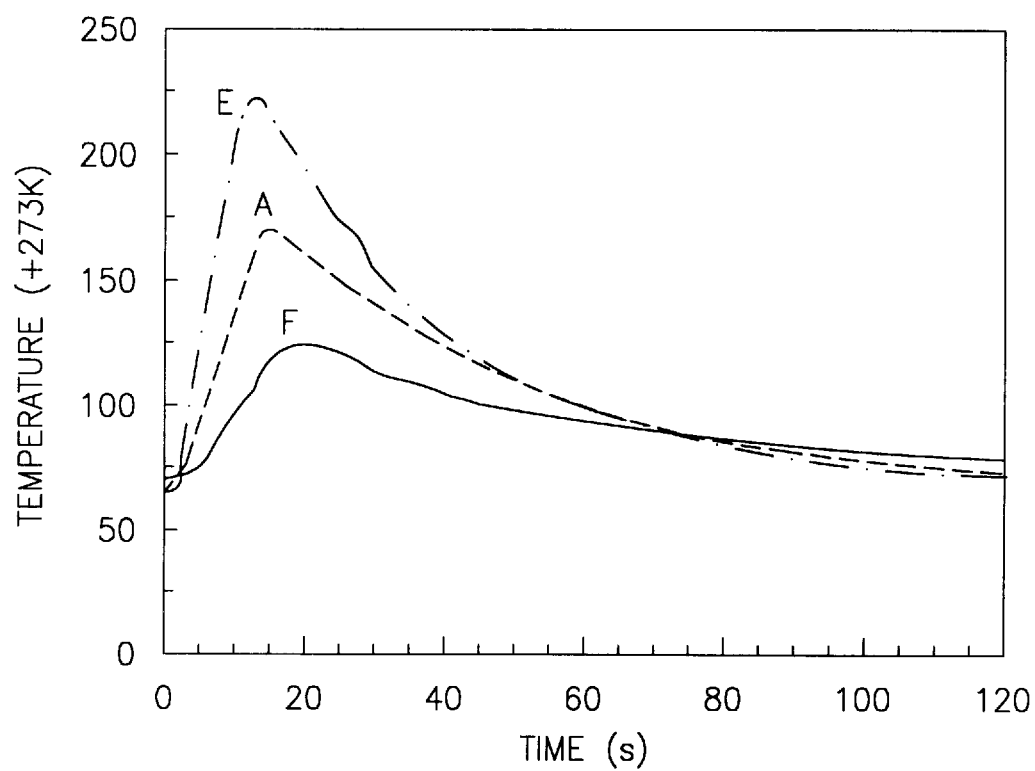
FIG. 13 is a chart showing examples of standard in-mould temperature profiles.

In FIG. 3, the mould segment and the inductor of FIG. 1 are shown in an enlarged view. The inductor is placed between the stationary mould half and the moving mould half by the robot R. When it is energized by high frequency oscillations, then the temperature in the surface layer of the metal mould (at points A, B and E) is increased steeply and the temperature in the bulk of the mould (at points C and D) is almost unchanged. The temperature time dependence shown in FIG. 13 illustrates by way of a example the course of temperature at positions A, E and F in FIG. 3 of the metal mould after high-frequency heating in accordance with Example 1. The split metal mould is opened, when the temperature of the mould surface reaches a predetermined temperature. The inductor 6 is withdrawn from the space between the fixed mould half and movable mould half by the robot R. Subsequently, the split mould is closed again to carry out the injection moulding of thermoplastic resin mixture in a conventional manner. Additional details of the high-frequency induction heating device and the mould component are disclosed in patent specification GB-B-2,081,171.

Figure 4:
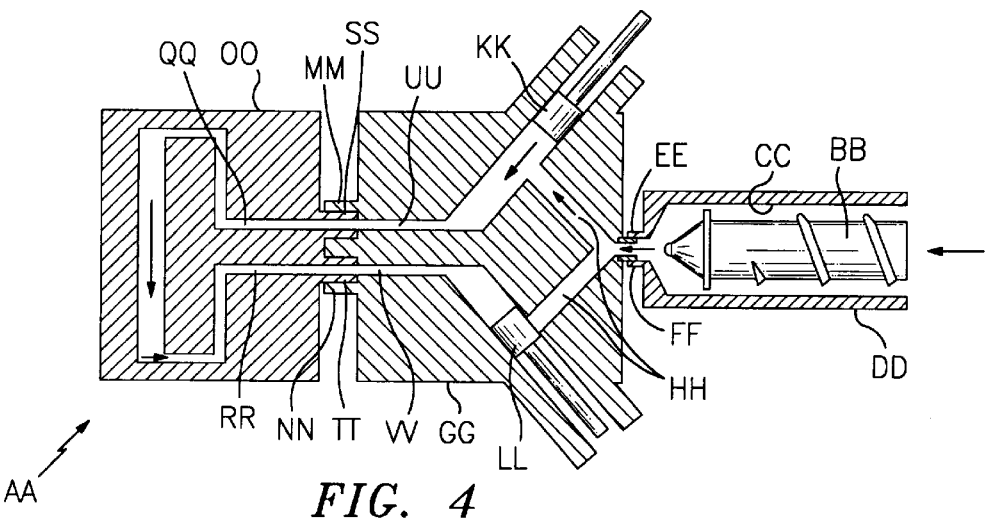
FIGS. 4 to 6, inclusive, are schematic plans, axially-sectioned along the flow path, of a manifold for the apparatus shown in FIGS. 1 and 2, representing different times in the moulding cycle, the manifold is shown in situ interposed between the mould and the injection moulding machine.

In FIG. 4, the injection moulding machine AA shown comprises a drivable injection screw BB mounted for rotation about, and for oscillation along, its axis within a substantially coaxially-extending elongated cavity CC of a cylindrical, heatable barrel DD. Downstream from the screw the cavity communicates within a nozzle EE lined with a bush FF, and upstream with a feed hopper (not shown) containing polymer feedstock.

Figure 5:
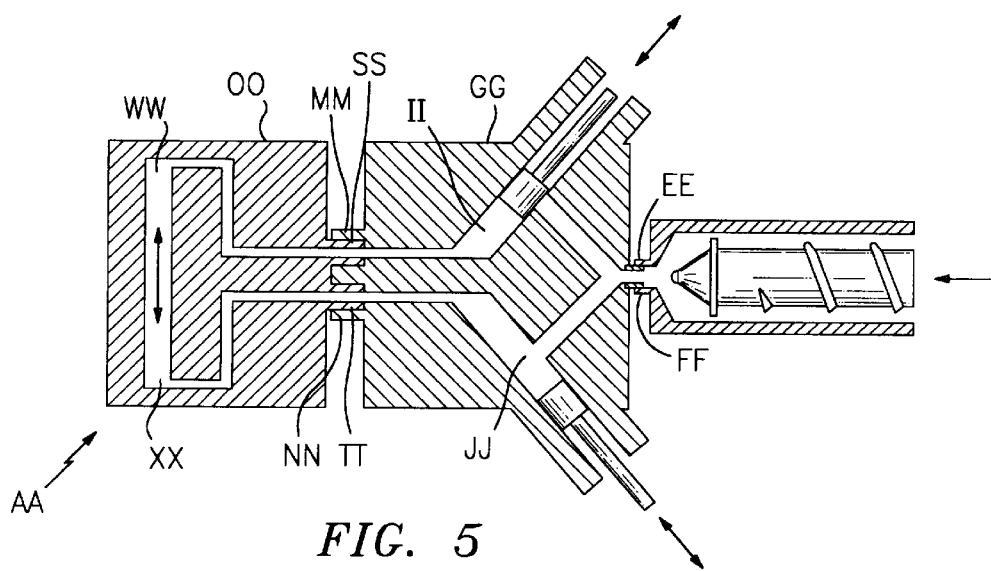
Figure 6:
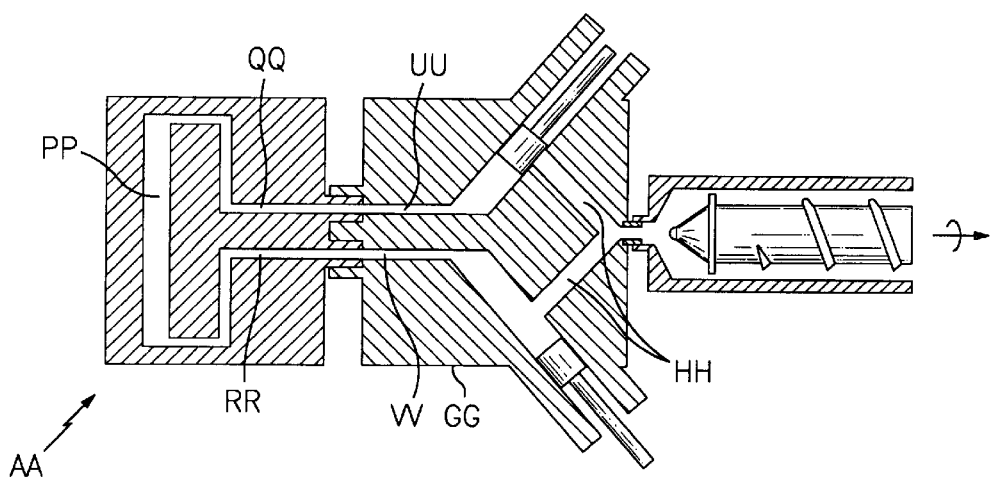

In the apparatus shown in FIGS. 4 to 6 of the drawings, nozzle EE mates with a manifold GG and the bush FF communicates with an axially-symmetric, bifurcated conduit HH, each branch of which leads upwardly into cylinders II, JJ in each of which is opposedly mounted an axially-slidable, drivable pistons KK, LL, respectively. In turn, each cylinder communicates by way of channels UU, VV with-axially aligned twin nozzles MM, NN which constitute the outlets of manifold GG.

The twin nozzles MM, NN mate with a mould OO (shown closed ) which comprises a double sprued, double gated bar mould cavity PP and sprues QQ, RR the inlets SS, TT which connect with the twin manifold outlet nozzles MM and NN respectively.

In use, at start-up the mould tooling is assembled; demoulding agent is applied to the surfaces defining the mould cavity; the mould is then closed and brought to temperature, for example from 20° C. to 80° C. Granular polymer feedstock is fed from the feed hopper into the elongated cavity and heated by the cylindrical barrel heater (not shown). The molten polymer feedstock is further heated, plasticised, and rendered substantially homogeneous by rotation of the injection screw. When the molten polymer feedstock is determined to be of the right viscosity, rotation and downstream translation of the injection screw exerts a propelling force to inject the molten material into the mould cavity which is preheated or being heated at the predetermined temperature by high frequency induction heating. The molten polymer feedstock enters the manifold and passes, successively, through cylinder II; nozzle MM; sprue QQ; mould cavity PP; sprue RR; nozzle NN and into cylinder JJ where further transport is prevented by piston LL. When the mould cavity, sprues and manifold are filled with molten polymer feedstock the injection screw is stopped from rotating but is held at a position to provide a constant packing force downstream thereof. It can thus be seen that the first function of the manifold is to split the single feed (ex nozzle EE) into the desired number of separate feeds. In this illustrated example the feed has been split into two identical channels UU and VV.

Pistons KK and LL are then reciprocated (see FIG. 5) at the same frequency, but out of phase with each other by 180°. This reciprocation generates periodic forces and so maintains the molten polymer feedstock in the mould cavity, sprues and manifold channel UU, VV under continual, oscillating shear which generates heat and which, by appropriate microprocessor control (not shown), enables the rate of cooling of the polymer feedstock to be controlled. In effect, periodic forces are exerted upon the material in the mould cavity PP, first at the end region WW where sprue QQ enters, and then at the opposite end at region XX where sprue RR enters, region WW, XX being indicated in FIG. 5. The molten polymer feedstock in the mould cavity is thus continuously sheared by repetitive injection of molten polymer feedstock from cylinders II and JJ. Shrinkage of the polymer feedstock on cooling is compensated for by further molten polymer feedstock necessarily being fed into the mould cavity from the manifold (and also from the elongated cavity) during the first reciprocation cycle.

In a preferred embodiment, this shear force is applied as the mould becomes full. For example, as one side of molten material reaches a junction point, its progress through the mould is substantially halted by appropriate control of the relevant piston. Material approaching the junction point from the other side thereof then has shear imparted thereto, by control of the relevant piston, such that shear forces are produced within the material as the portions thereof come into contact with one another. It has been found that this embodiment, which effectively applies shear forces just before the mould cavity becomes full, can efficiently remove the junction between the material portions. This can assist in reducing the time during which the surface of the mould cavity needs to be heated and thereby also the cooling time required.

At the end of the first reciprocation cycle (when a substantial proportion of the polymer feedstock in the mould cavity has solidified but while that in the gates is still molten) the pistons are, in a second reciprocation cycle, reciprocated in phase with each other so that the periodic forces which they apply now constitute packing forces auxiliary to the propelling force exerted by the injection screw, until the polymer feedstock in the gate has solidified.

In the preferred embodiment, the internal surfaces of the mould are heated to a substantially greater temperature than provided in prior art induction heated systems. More specifically, rather than being heated to the distortion temperature of the material, which provides a good surface finish, the surfaces of the mould cavity are heated to the melt processing temperature of the material to be moulded. It has been found that processing at such a temperature can remove signs of junctions between portions of material in the mould, which was not possible with prior art induction heating processes.

This effect can also be obtained, it has been found, at temperatures slightly less than the melt processing temperature. Typical processing temperatures are around two times the distortion temperatures previously used. It has also been found that this does not adversely affect the surface finish.

The mould is then removed from the manifold; the moulded polymer feedstock is demoulded; and the injection screw is translated upstream ready for the next injection mould cycle.

It may be desirable, in successive injection moulding cycles, to alternate injection of the molten polymer feedstock between cylinders II and JJ in order to prevent polymer feedstock becoming trapped in a nozzle and thereby becoming degraded.

Figure 7:
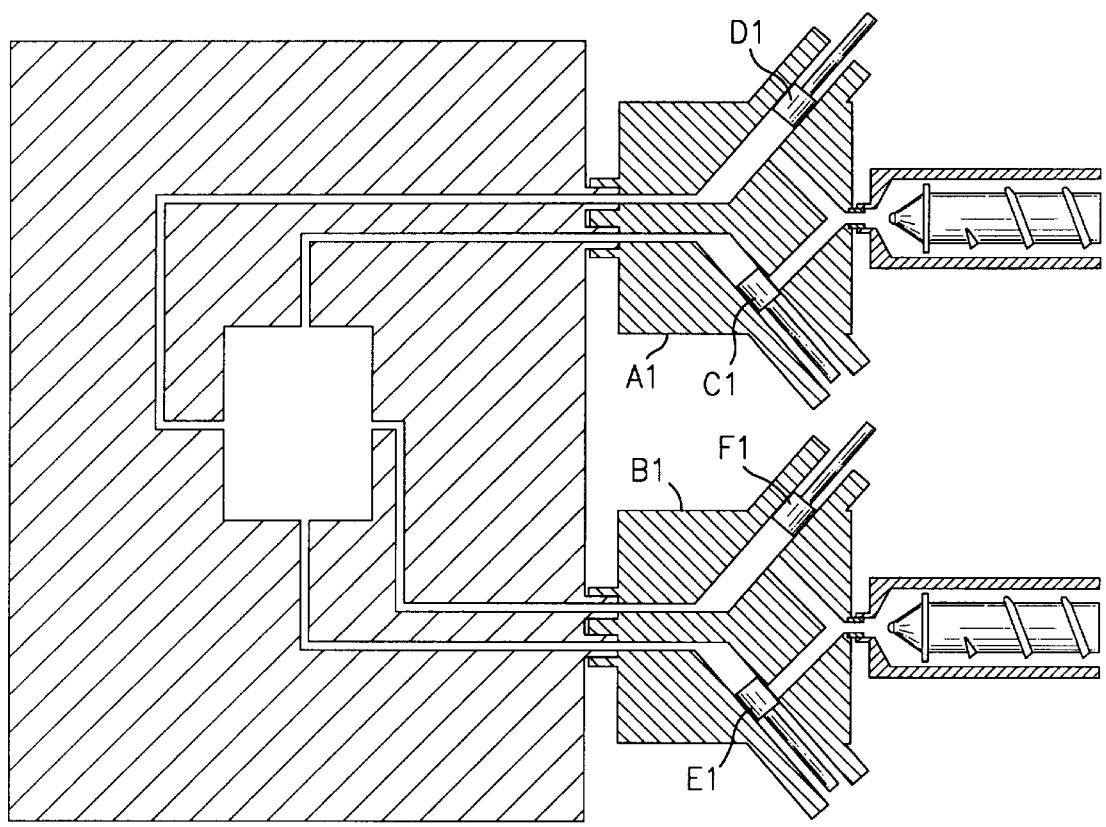
FIG. 7 is another embodiment comparable to FIGS. 4 to 6 when a twin barrel injection moulding machine is used.

FIG. 7 shows another embodiment of moulding apparatus. In this case two manifolds A1 and B1 are attached to each injection unit on a two color injection moulding machine. Alternating successively during solidification between the out of phase operation of pistons C1 and E1 and then D1 and F1 produces a laminated structure of preferred fiber orientation, the number of laminates and the preferred orientation of fibers within each laminate being determined by the sequence of operation of the pistons C1, D1, E1 and F1.

Other details of the shear control device are disclosed in the patent specification GB-B-2,170,142.

Figure 8:
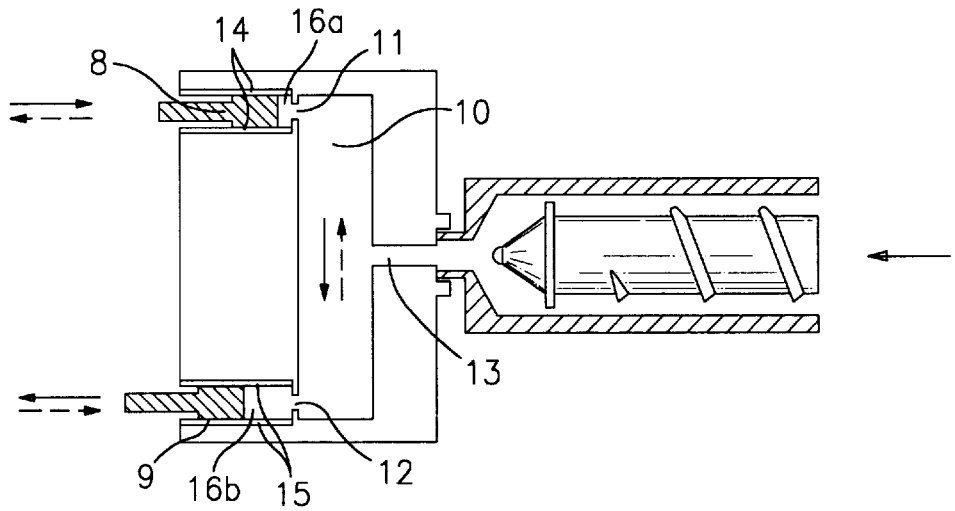
FIG. 8 represents a variant wherein devices for applying a periodic shear force are inserted within the mould cavity.

FIG. 8 shows another embodiment of moulding apparatus. In this case two manifolds 8 and 9 are incorporated in a mould and each are in contact with the mould cavity 10, by the gates and runner systems 11 and 12 neither of which are coincident with the material supply runner and gate system 13. The manifold may be equipped with heaters 14 and 15 to assist the movement of molten materials. The volume (16a, 16b) which is stocked with molten material is of a size which would produce a macroscopic shear and displacement of the molten material between 16a and 16b when the volume of 16a and 16b is displaced between the locations of the two gates.

Figure 9:
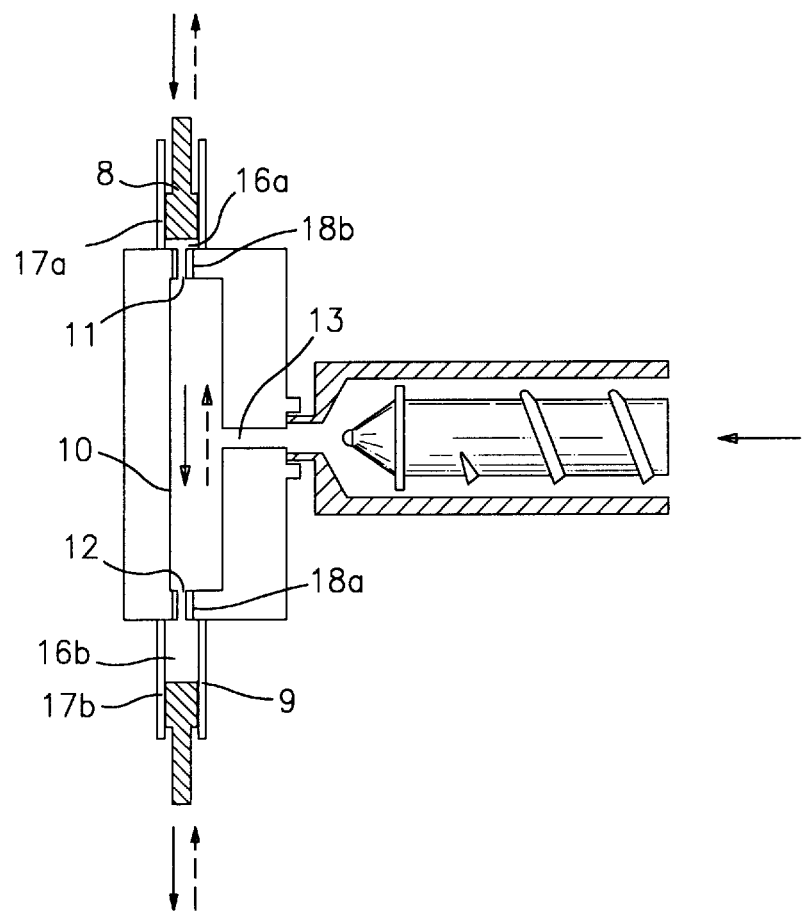
FIG. 9 represents a variant wherein devices for applying a periodic shear force are located on the mould and not between molten material supply means and mould.

In the embodiment of moulding apparatus shown in FIG. 9, two manifolds 8 and 9 are attached to a mould and are each in contact with the mould cavity, 10, by the gate and runner systems 11 and 12, neither of which is coincident with the material supply runner and gate system 13. The manifolds may be equipped with heaters 17a,17b or/and 18a,18b to assist in the movement of molten materials. The volume (16a, 16b) which is stocked with molten material is of a size which would produce a macroscopic shear and displacement of the molten material between 16a and 16b when the volume of 16a and 16b is displaced between the locations of the two gates.

Figure 10:
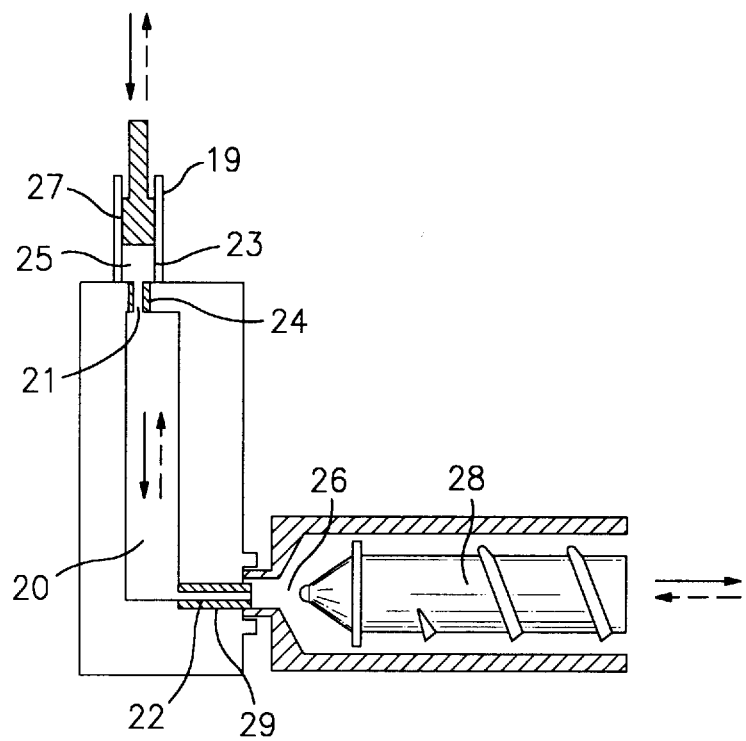
FIG. 10 represents a variant wherein a device for applying a periodic shear force is located on or within the mould, and not between the molten material supply means and the mould, and used in combination with an oscillating screw on the primary injection unit.

FIG. 10 shows another embodiment of moulding apparatus in which a single manifold 19 is attached to or in a mould and is in contact with the mould cavity 20, by a runner and gate system 21, which is not coincident with the runner and gate system 22 of the supply means to the cylinder of the injection moulding machine. The manifold may be equipped with heaters 23 and/or 24 to assist the movement of molten materials. The volume 25 which is stocked with molten material is of a size which would produce a macroscopic shear and displacement of the molten material between 25 and 26 when the volume of 25 and 26 is displaced between the locations of the two gates. The molten material can be sheared by using the power of piston 27 and injection cylinder 28. A heater 29 may be placed around the sprue and/or runner to prevent the material solidifying in the feed channel, 21, connecting the shearing means 28 and the mould cavity 20.

Figure 11:
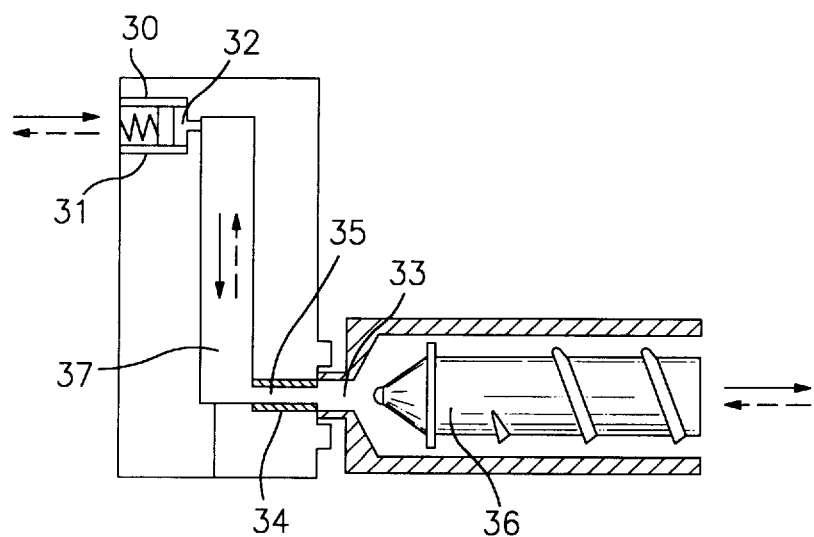
FIG. 11 represents a variant wherein a device for the production of the periodic shearing forces installed on/in the mould is operated by a means other than by hydraulic power.

The embodiment shown in FIG. 11 includes a device 30 which is not operated by hydraulic power is attached to or incorporated in a mould. For example a spring loaded piston, a screw driven or other mechanical device. The device may be equipped with heater 31 to assist the movement of the molten materials. The volume 32 which is stocked with molten material is of a size which would produce a macroscopic shear and displacement of the molten material between 32 and 33 when the volume of 32 and 33 is displaced between the locations of the two gates. A heater 34 may be placed around the sprue and/or runner to prevent the material solidifying in the feed channel, 35, connecting the shearing means 36 and the mould cavity 37.

An advantage of the embodiments shown in FIGS. 8 to 11 is that the same machine head can be used because the shear inducing devices (e.g., pistons) are provided as appropriate on the mould tool. There can thus be a significant saving in cost and moulding efficiency. Moreover, with the locations of the shear inducing devices shown in the embodiments of FIGS. 8 to 11, there is greater selectivity in locations for the introduction of shear into the molten material in the mould, greater effectiveness in terms of the speed at which shear can be produced in regions of the molten material and less pressure required due to the closeness of the shear inducing devices to the mould cavity. These advantages can lead to an increase in the speed at which the material can be treated and therefore a reduction in the time during which the walls of the mould cavity need to be above or at the material processing temperature.

The moulding process can be further speeded up by introducing cooling within the mould tool, such as by cooling channels and the like.

There follow some Examples of processes for moulding materials, which are given for the purpose of illustration only.

EXAMPLE 1

Figure 12A:
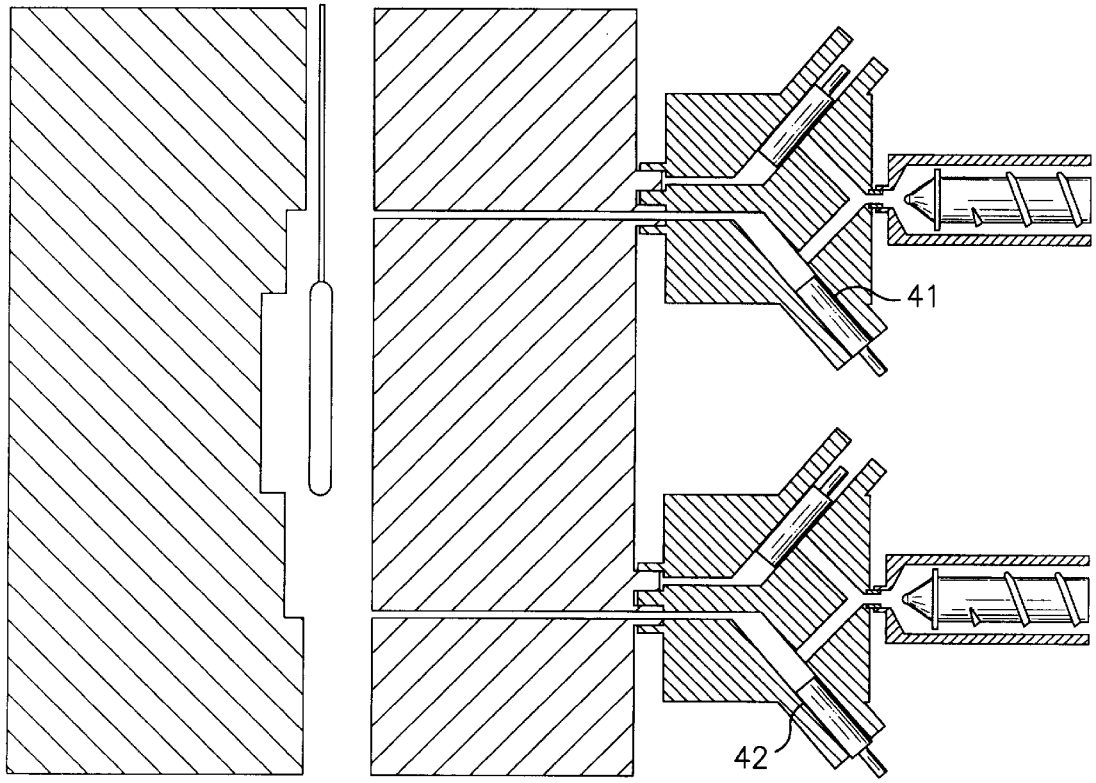
FIG. 12 shows an illustration of mould and shear control devices for a twin barrel injection machine in accordance with Examples 1, 2 and 3 and References 1, 2 and 3.
Figure 12B:
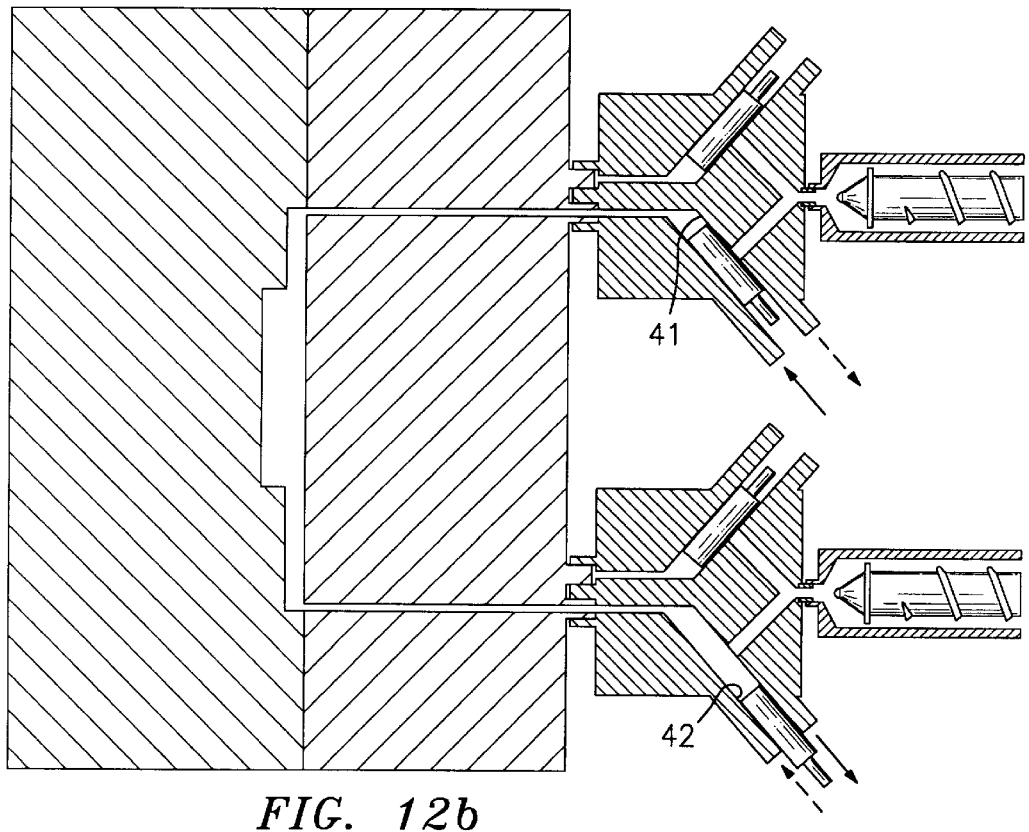

In this Example, the injection moulding machine, the high-frequency induction heating and shear control devices were arranged essentially as is shown in FIG. 1 and FIG. 12. The position of high-frequency induction heating device is shown in (A) of FIG. 12, and the arrangement for applying periodic forces is shown in (B) of FIG. 12.

Figure 18:
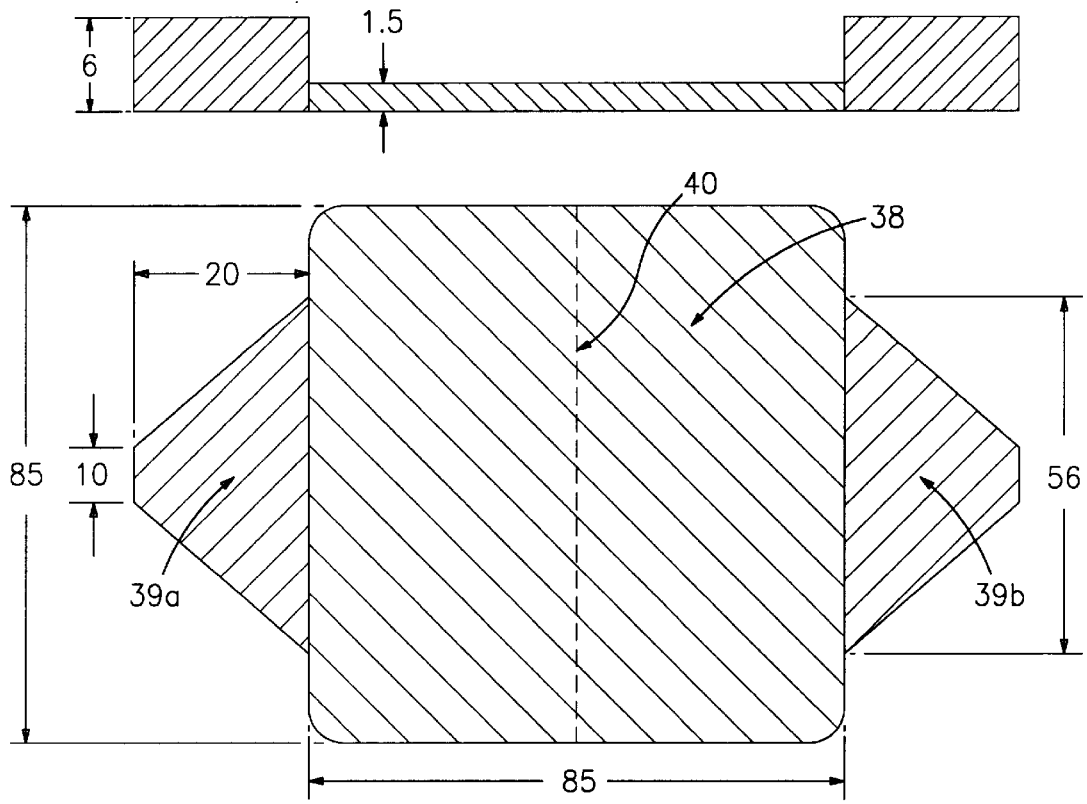
FIG. 18 illustrates the size and shape of the moulded article used in Examples.

A SAN resin composition containing 20% by weight of glass fiber was injection moulded by using a twin barrel injection moulding machine. A split mould made of steel was used which provided for moulding a flat square piece 38 having a thickness of 1.5 mm (FIG. 18) through opposing fan gates 39a and 39b each measuring 56, 10×20×6 mm as shown in FIG. 18.

The inductor was placed between the mould halves and energized up to a high frequency output of 20 KHz at 15 KW for 12 seconds.

The temperatures of the injection barrels were adjusted so as to obtain a resin mixture temperature of 240° C. Before injecting the resin mixture into the mould, the inductor prepared as above was lowered between the two mould halves by robot operation. The distances between the inductor and mould surfaces was 8 mm. After activation the oscillations at 20 KHz at 15 KW for 12 seconds, the split mould was retracted to draw out the inductor before it was closed again. Then, the molten SAN resin composition containing glass fiber was injected into the mould through the manifold at an injection pressure of 100 bar. The mould cavity was filled through the fan gates to produce a weld line at the center of the plate denoted as 40 as shown in FIG. 18. This was immediately followed by the oscillation of the pistons 41 and 42 (see FIG. 12) at the same frequency, but out of phase with each other by 180°. The oscillation of the pistons lasted only one cycle, that is, for 3 seconds. Thereafter, the moulding was cooled for 40 seconds under static pressure provided by both pistons each set at 40% of the maximum hydraulic pressure of the pump. This was followed by the ejection of the moulded component.

Figure 19:
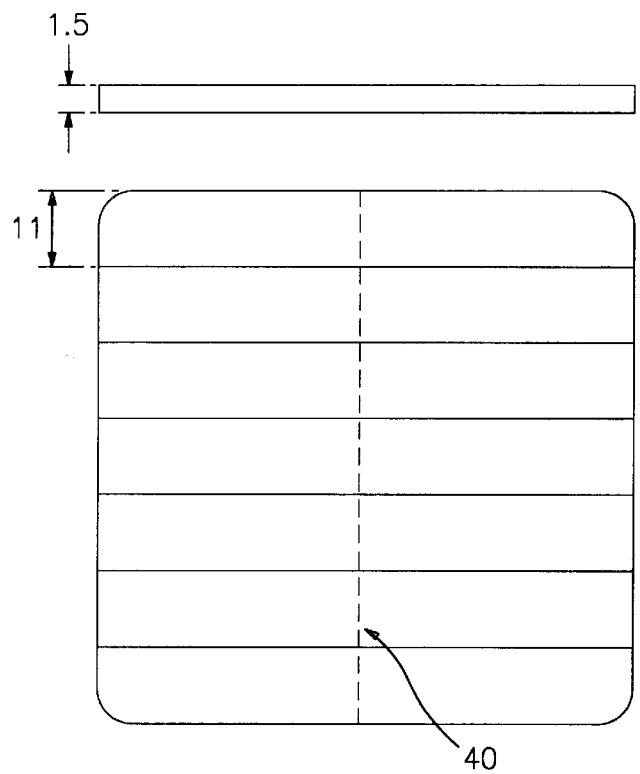
FIG. 19 illustrates the sizes and shapes of the flexural test specimens used in Examples 1 and 2.

The flexural properties of the moulding were determined by 3-point flexural testing at room temperature (23° C.). Strip samples were cut from the mouldings as shown in FIG. 19. The flexural properties of the samples were tested at a cross-head speed of 0.7 mm/min.

Figure 20:
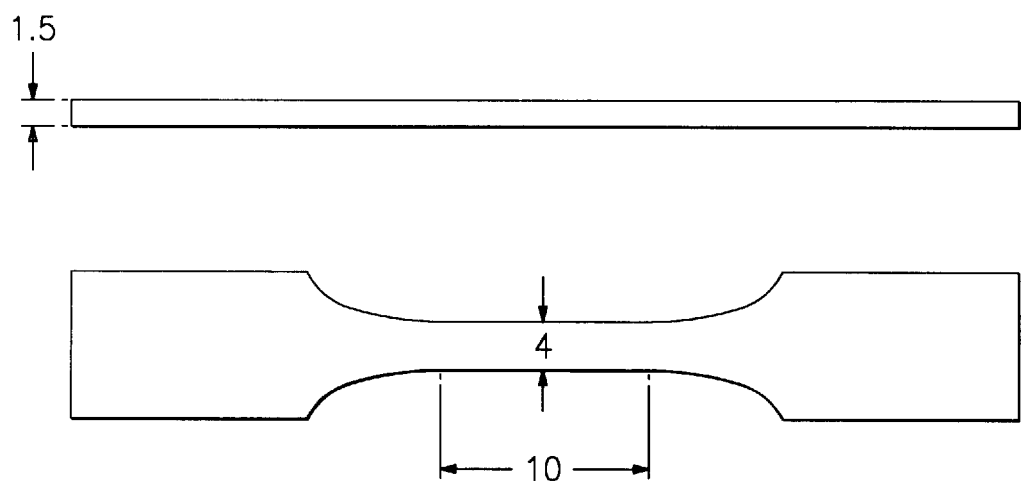
FIG. 20 illustrates the sizes and shapes of the tensile test bars used in Examples 1 and 2.

The tensile strength of the mouldings was determined by using tensile test bars which were shaped from the above mentioned rectangular strips as shown in FIG. 20. The tensile test was conducted at room temperature (23° C.) and at a cross-head speed of 5 mm/min.

The flexural and tensile test results are given in Table 1.

The temperature-time chart shown in FIG. 13 illustrates an example of the course of temperature changes at some positions (at points A, E and F in FIG. 3) of the metal mould after high-frequency induction heating using the same preheating conditions as in Example 1.

REFERENCE 1

(The Production of Reference Moulding to Example 1)

In the production of reference mouldings, the same injection moulding machine, same mould and the same resin composition as in Example 1 were used.

The processing conditions used were:

(a) Resin temperature: 240° C.

Mould temperature: 60° C.

Cooling time: 40 seconds

Injection pressure: 100 bar

Holding pressure: 40 bar

N.B. The production of the reference mouldings was conducted without mould pre-heating and the application of periodic force, i.e. no piston oscillation.

(b) As the processing conditions used in (a) above, without mould preheating but using the same periodic force as used in Example 1.

(c) As the processing conditions used in (a) above with mould preheating as used in Example 1, but without the application of periodic force, i.e. no piston oscillation.

The samples for mechanical properties testing were prepared by the same method as in Example 1 and are also included in Table 1.

TABLE 1

| | Moulding Process | | | | |
|---|---|---|---|---|---|
| | | Reference Mouldings | | | |
| | Example 1 | (a) | (b) | (c) | (*) |
| Flexural modulus (GPa) | 6.57 (0.36) | 5.67 (0.25) | 6.33 (0.54) | 5.59 (0.19) | 6.00 (0.31) |
| Flexural strength (MPa) | 144.4 (7.6) | 105.9 (6.6) | 123.9 (9.8) | 111.7 (5.5) | 131.9 (7.4) |
| Tensile strength (MPa) | 94.20 (9.86) | 56.59 (4.37) | 85.35 (8.87) | 57.97 (1.21) | 76.99 (11.10) |
| Appearance | Excellent | Poor | Poor | Excellent | Poor |

( ): Standard deviation based on more than fourteen (14) samples
(a): Conventional moulding without mould pre-heating and without application of a periodic force
(b): Moulding with periodic force but without mould pre-heating
(c): Moulding with mould pre-heating but without a periodic force
(*): The same specimens as (a) (which contains a weldline) were used but the region of test was weldline-free.

The flexural properties measured are greatest for mouldings produced as in Example 1 and as compared to the Reference mouldings. The fact that the properties of mouldings of Example 1 are also greater than (*) mouldings (weldline-free) strongly suggests the advantage of this example of moulding process.

The tensile strengths of the Example 1 mouldings are again compared to the Reference mouldings. The increase is more marked than recorded for the (b) mouldings. This suggests the clear advantage of using both the periodic force by piston oscillation and the mould pre-heating, as suggested by the tensile strength value of (c) mouldings which is markedly lower than the tensile strength value of the mouldings referred to in Example 1.

To conclude, the mechanical properties shown in Table 1 clearly indicate the significant improvements gained by using the combination of mould preheating effected by high-frequency induction heating and periodic forces provided by piston oscillation.

With respect to the surface appearance of mouldings, the use of high frequency induction heating distinctly shows a much superior finish than any of the mouldings whose production did not use the high-frequency induction heating method. Although the use of the high-frequency induction heating method without the application of periodic force gave excellent surface finish, the translucent mouldings exhibited evidence of a weldline located within the core of the mouldings. However, the use of both high-frequency induction heating and a periodic force produced the most superior surface finish without any visual evidence of a weldline, either in the skin or in the core region.

EXAMPLE 2

In this Example, the injection moulding machine, the high-frequency induction heating and the shear control devices were arranged essentially as shown in FIG. 1 and FIG. 12. The position of the high-frequency induction heating device is shown in (A) of FIG. 12, and the arrangement of applying of periodic forces is shown in (B) of FIG. 12.

An ABS resin composition containing 30% by weight of glass fiber was injection moulded using a twin barrel injection moulding machine. A split mould made of steel was used which provided for moulding a flat square piece A having a thickness of 1.5 mm (FIG. 18) through opposing fan gates 39a and 39b each measuring 56, 10×20×6 mm as shown in FIG. 18.

The inductor was placed between the mould halves and energized up to a high frequency output of 20 KHz at 15 KW for 12 seconds.

The temperatures of the injection barrels were adjusted so as to obtain a resin mixture temperature of 240° C. Before injecting the resin mixture into the mould, the inductor prepared as above was lowered between the two mould halves by robot application. The distance between the inductor and moving half mould surface was 8 mm, and the distance between the inductor and fixed half mould surface was 15 mm. After activating the inductor at 20 KHz at 15 KW for 12 seconds, the split mould was retracted in order to withdraw the inductor before the mould was closed again. Then, the molten ABS resin composition containing glass fiber was injected into the mould through the manifold at an injection pressure of 100 bar. The mould cavity was filled through the fan gates to produce a weld line at the center of the plate denoted as 40 as shown in FIG. 18. This was immediately followed by the oscillation of the pistons 41 and 42 (see FIG. 12) at the same frequency, but out of phase with each other by 180°. The oscillation of the pistons lasted four cycles, that is, for 12 seconds. Thereafter, the mould was cooled for 20 seconds under static pressure provided by both pistons each set at 40% of the maximum hydraulic pressure of the pump. This was followed by the ejection of the moulded component.

The flexural properties of the moulding were determined by 3-point flexural testing at room temperature (23° C.). Strip samples were cut from the mouldings as shown in FIG. 19. The flexural properties of the samples were tested at a cross-head speed of 0.7 mm/min.

The tensile strength of the mouldings was determined by using tensile test bars which were shaped from the above mentioned rectangular strips, as shown in FIG. 20. The tensile test was conducted at room temperature (23° C.) and at a cross-head speed of 5 mm/min.

The flexural and tensile test results are given in Table 2.

REFERENCE 2

(The Production of Reference Mouldings to Example 2)

In the production of reference mouldings, the same injection moulding machine, same mould and same resin composition as in Example 2 were used. The processing conditions used were:

Resin temperature: 240° C.
Mould temperature: 50° C.
Cooling time: 20 seconds
Injection pressure: 100 bar
Holding pressure: 40 bar
N.B. The production of the reference mouldings was conducted without mould pre-heating and the application of periodic force, i.e. no piston oscillation.

The samples used for mechanical properties testing were prepared by the same method as in Example 2.

The flexural and tensile test results are given in Table 2.

Figure 14:
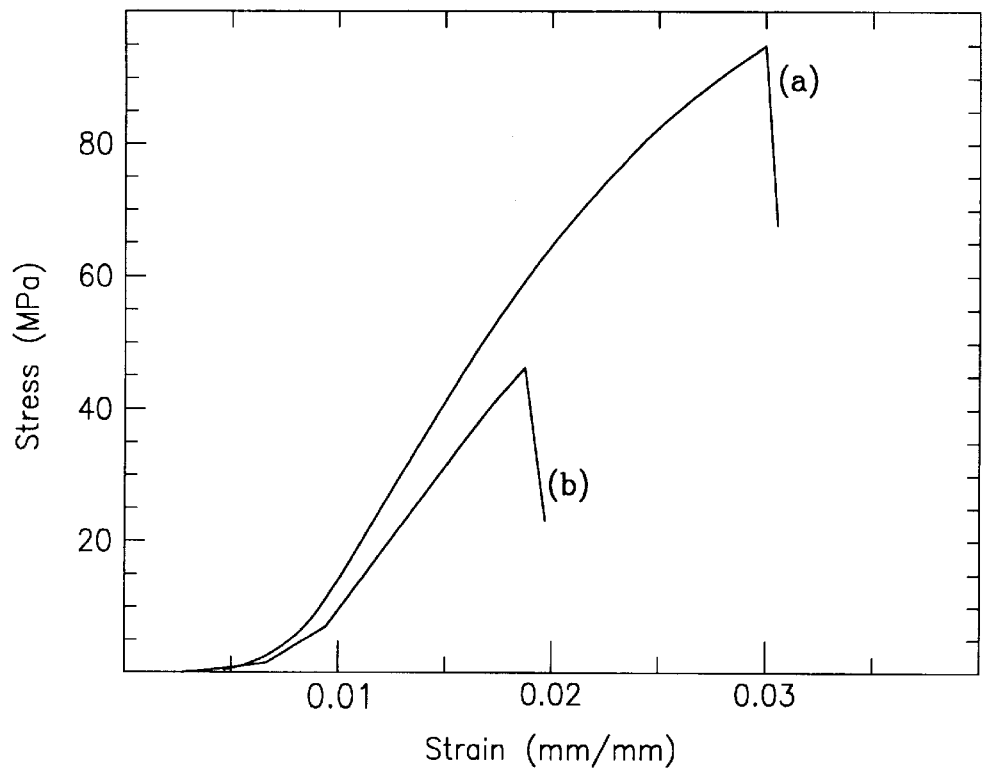
FIG. 14 represents stress-strain curves for the tensile testing of mouldings prepared in accordance with Example 2 and Reference 2 as given on the following pages.

The stress-strain curves produced in the tensile tests are shown in FIG. 14;

(a) indicates the stress-strain curve in accordance with the process used in Example 2;

(b) indicates the stress-strain curve in accordance with Reference 2.

Figure 15:
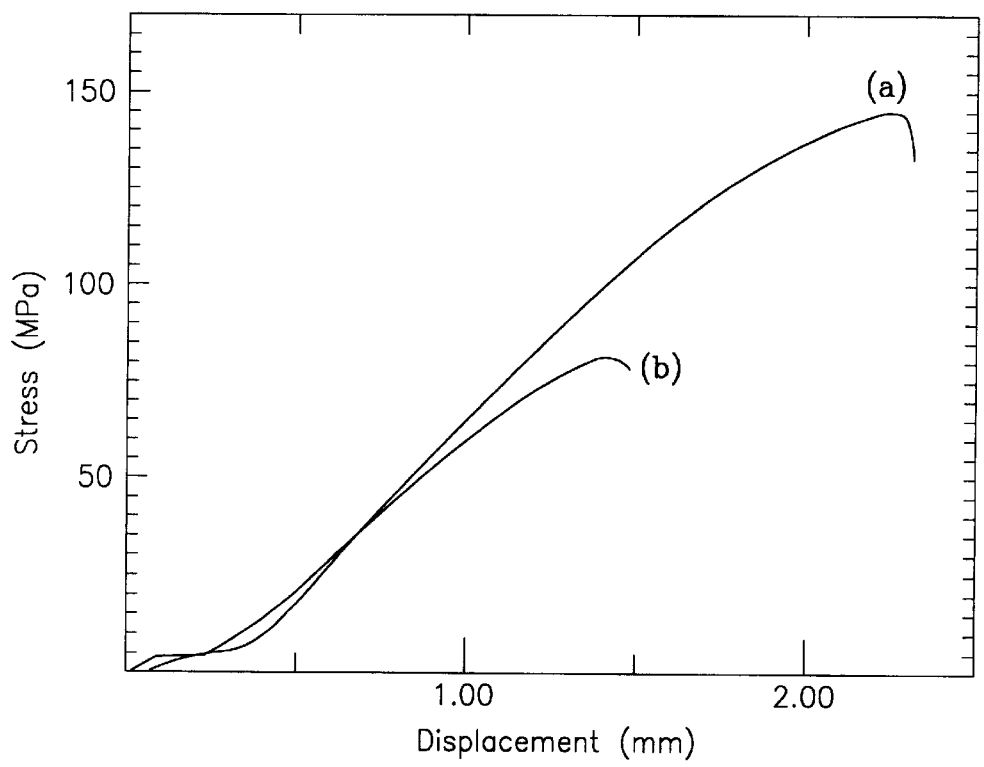
FIG. 15 represents stress-displacement curves for the flexural testing of mouldings prepared in accordance with Example 2 Reference 2 as given on the following pages.

The stress-displacement curves produced during flexural tests are shown in FIG. 15; (a) indicates the stress-displacement curve in accordance with the invention in accordance with Example 2; (b) indicates the stress-displacement curve in accordance with Reference 2.

TABLE 2

| Moulding Process | Example 2 | Reference 2 (Conventional Mouldings) |
| --- | --- | --- |
| Flexural modulus (GPa) | 6.96 (0.33) | 6.05 (0.38) |
| Flexural strength (MPa) | 141.8 (5.0) | 86.66 (3.7) |
| Tensile strength (MPa) | 85.03 (4.01) | 48.62 (2.61) |
| Appearance | Excellent | Poor |

( ): Standard deviation based on more than fourteen (14) samples

These results show that mechanical properties of moulded articles produced by the above-mentioned processes can be substantially improved by the application of a periodic force. Such processing causes the weld strength of glass fiber reinforced mouldings to increase over that of the strength of the part without internal weldlines.

Moreover it will be seen that the flexural modulus of the specimens prepared in the Example is increased by 16%, relative to the comparative specimen made by conventional injection moulding.

The appearance of the moulded article surface reproduced the preheated mould cavity (moving side mould) at a predetermined temperature was excellent and showed no fault such as a weldline, streaks or exposure of glass fiber on the outer face.

EXAMPLE 3

In this Example, the injection moulding machine, the high-frequency induction heating and shear control devices were arranged essentially as is shown in FIG. 1 and FIG. 12. The position of the high-frequency induction heating is shown in (A) of FIG. 12, and the arrangement for the application of periodic forces is shown in (B) of FIG. 12.

A clear ABS resin composition containing 2% by weight of aluminum flake having a medium flake diameter of 75 μm was injection moulded using a twin barrel injection moulding machine. A split mould made of steel was used which provided for moulding a flat square piece A having a thickness of 1.5 mm (FIG. 18) through opposing fan gates 39a and 39b each measuring 56, 10×20×6 mm as shown in FIG. 18.

The inductor was placed between the mould halves and energized up to a high frequency output of 20 KHz at 15 KW for 22 seconds.

The temperatures of the injection barrels were adjusted so as to obtain a resin mixture temperature of 240° C. Before injecting the resin mixture into the mould, the inductor prepared as above was lowered between the two mould halves by robot operation. The distances between the inductor and mould surfaces were 8 mm. After actuating the oscillation at 20 KHz at 15 KW for 22 seconds, the split mould was retracted to draw out the inductor before it was closed again. Then, the molten ABS resin composition containing aluminum flake was injected into the mould through the manifold at an injection pressure of 100 bar. The mould cavity was filled through the fan gates to produce a weld line at the center of the plate denoted as 40, as shown in FIG. 18. This was immediately followed by the oscillation of the pistons 41 and 42 (see FIG. 12) at the same frequency, but out of phase with each other by 180°. The oscillation of the pistons lasted only one cycle, that is, for 3 seconds. Thereafter, the moulding was cooled for 20 seconds under static pressure provided by both pistons each set at 40% of the maximum hydraulic pressure of the pump, and then cooled for 70 seconds without static pressure. This was followed by the ejection of the moulded component.

The appearances of the moulded articles are summarized in Table 3.

REFERENCE 3

(The Production of Reference Mouldings to Example 3)

In the production of reference mouldings, the same injection moulding machine, same mould and same resin composition as in Example 3 were used.

The processing conditions used were:

(a) Resin temperature: 240° C.

Mould temperature: 50° C.

Cooling time: 40 seconds

Injection pressure: 100 bar

Holding pressure: 40 bar

N.B. The production of the reference mouldings was conducted without mould preheating and the application of periodic force, i.e., no piston oscillation.

(b) As the processing conditions used in (a) above, without mould preheating but using the same periodic force as used in Example 3.

(c) As the processing conditions used in (a) above with mould preheating as used in Example 3, but without a periodic force, i.e., no piston oscillation.

A summary of the appearance of moulded articles is given in Table 3.

TABLE 3

| Moulding Process | Appearance of moulded article |
| --- | --- |
| Example 3 | Excellent. The surface of the moulded article showed a complete absence of the weldline mark without any evidence of faults such as flow marks. Exposure of aluminum flake was absent on any other surface. |
| Reference 3 (a) | The appearance of the moulded article showed a weldline mark and the appearance of moulded article was rough. |
| Reference 3 (b) | The weldline mark was only slightly affected by application of periodic force. However, the appearance of the moulded article showed a weldline mark, and the appearance of moulded article was rough. |
| Reference 3 (c) | The surface finish of the moulding was excellent with no exposure of aluminum flake on the outer surface. However, a weldline could be seen clearly in the core of the moulded article. |

Figure 16:
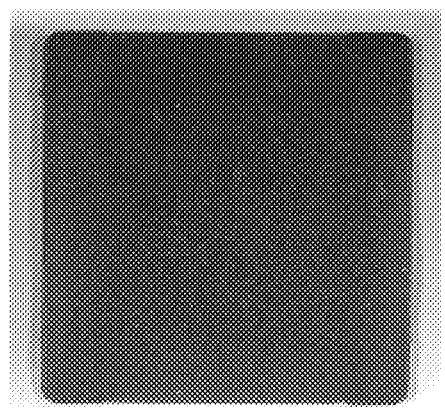
FIG. 16 is a photograph of the surface appearance in accordance with Example 3.

Photographs of the moulded article are shown in FIGS. 16 and 17. FIG. 16 shows the moulded article in accordance with Example 3. FIGS. 17(a), 17(b) and 17(c) shows the moulded articles in accordance with Reference 3(a), 3(b) and (c).

Thus, it was found that the process of this Example showed a dramatic and positive effect on the weldline defect and the surface finish.

The disclosures in British patent application 9507533.8, from which this application claims priority, and in the abstract accompanying this application are incorporated herein by reference.

What is claimed is:

1. An injection moulding process for moulding a molten material, containing at least one kind of thermoplastic resin having a heat distortion temperature and a melt processing temperature, in a mould having a mould cavity and at least one channel communicating with the mould cavity, each channel entering the mould at a respective mould inlet, the process comprising:

heating inner surface areas of the mould to the melt processing temperature of the material prior to supplying the molten material into the mould;

supplying the molten material into the mould by way of at least one channel and subjecting the molten material to a propelling force, sufficient to propel it through the channel into the mould;

applying periodic forces to the material in the mould at a plurality of spaced-apart regions, a first and a second of the regions being located on either side of the molten material in the mould cavity, the periodic force being applied with a difference in phase so as to cause shear of the molten material within the mould cavity between the first and second regions;

allowing the molten material in the mould to solidify by cooling the mould below the heat distortion temperature of the resin while or after applying the periodic force; and then opening the mould, and removing the moulded article.

2. The moulding process of claim 1, wherein the inner surface area of the mould is heated by high-frequency induction heating.

3. The moulding process of claim 1, wherein the periodic forces are applied as the mould becomes filled with molten material.

4. The moulding process of claim 1, wherein the molten material comprises a polymer material.

5. The moulding process of claim 4, wherein the polymer material comprises a thermosetting resin.

6. The moulding process of claim 1, wherein the molten material contains fillers, additives and mixtures thereof.

7. The moulding process of claim 6, wherein the molten material contains aluminum flakes.

8. The moulding process of claim 1, wherein the process further comprises:

forming a skin layer to the inner surface areas of the mould, wherein the formed skin layer is applied to the material during moulding thereof.

* * * * *